United States Patent
Wan et al.

(10) Patent No.: US 11,514,249 B2
(45) Date of Patent: Nov. 29, 2022

(54) DOMAIN-ADAPTED SENTIMENT PREDICTION FOR LONG OR UNBALANCED TEXT THREADS

(71) Applicant: Microsoft Technology Licensing, LLC, Redmond, WA (US)

(72) Inventors: Zhiling Wan, Santa Clara, CA (US); Chih-Hui Wang, Sunnyvale, CA (US); Haichao Wei, Santa Clara, CA (US); Lili Zhou, Saratoga, CA (US); Huiji Gao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 16/859,898

(22) Filed: Apr. 27, 2020

(65) Prior Publication Data
US 2021/0334467 A1 Oct. 28, 2021

(51) Int. Cl.
*G06F 40/30* (2020.01)
*G06N 3/04* (2006.01)
*G06N 3/08* (2006.01)

(52) U.S. Cl.
CPC .......... *G06F 40/30* (2020.01); *G06N 3/0454* (2013.01); *G06N 3/08* (2013.01)

(58) Field of Classification Search
None
See application file for complete search history.

(56) References Cited

U.S. PATENT DOCUMENTS

2021/0073377 A1* 3/2021 Coull ................ G06N 3/08

OTHER PUBLICATIONS

"Bag-of-Words Model", Retrieved from: https://en.wikipedia.org/wiki/Bag-of-words_model, Retrieved on Mar. 27, 2020, 5 Pages.
"Deep Learning", Retrieved from: https://en.wikipedia.org/wiki/Deep_learning, Retrieved on Mar. 27, 2020, 31 Pages.
"Latent Semantic Analysis", Retrieved from: https://en.wikipedia.org/wiki/Latent_semantic_analysis, Retrieved on Mar. 27, 2020, 11 Pages.
"Machine Learning", Retrieved from: https://en.wikipedia.org/wiki/Machine_learning, Retrieved on Mar. 27, 2020, 21 Pages.
"Pointwise Mutual Information", Retrieved from: https://en.wikipedia.org/wiki/Pointwise_mutual_information, Retrieved on Mar. 27, 2020, 5 Pages.
"Support-Vector Machine", Retrieved from: https://en.wikipedia.org/wiki/Support-vector_machine, Retrieved on Mar. 27, 2020, 18 Pages.
Bussing et al., "A Machine Learning Approach to Automated Customer Satisfaction Surveys", https://towardsdatascience.com/a-machine-learning-approach-to-automat . . . , dated Nov. 23, 2019, 3 pages.
Bussing et al., "A Machine Learning Approach to Topic and Sentiment Recognition in Customer Service Call Audio", Colorado School of Mines Department of Computer Science, dated Jun. 19, 2018, 9 pages.

* cited by examiner

*Primary Examiner* — Quynh H Nguyen
(74) *Attorney, Agent, or Firm* — NDWE, LLP

(57) ABSTRACT

Embodiments of the disclosed technologies use machine learning to produce thread level classification data and case level classification data.

20 Claims, 9 Drawing Sheets

DOMAIN-ADAPTED SENTIMENT PREDICTION FOR LONG OR UNBALANCED TEXT THREADS

TECHNICAL FIELD

Technical fields to which this disclosure relates include natural language processing and machine learning-based sentiment classification of text.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020 LinkedIn Corporation.

BACKGROUND

Software product support software includes case management software for handling customer support tickets. An example is customer support software that helps organizations track customer queries and concerns about their products.

Existing approaches to sentiment analysis can be grouped into three main categories: knowledge-based techniques, statistical methods, and hybrid approaches. Knowledge-based techniques classify text by affect categories based on the presence of unambiguous affect words such as happy, sad, afraid, and bored. Some knowledge bases not only list obvious affect words, but also assign arbitrary words a probable "affinity" to particular emotions. Statistical methods leverage elements from machine learning such as latent semantic analysis, support vector machines, bag of words, Pointwise Mutual Information for Semantic Orientation, and deep learning.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
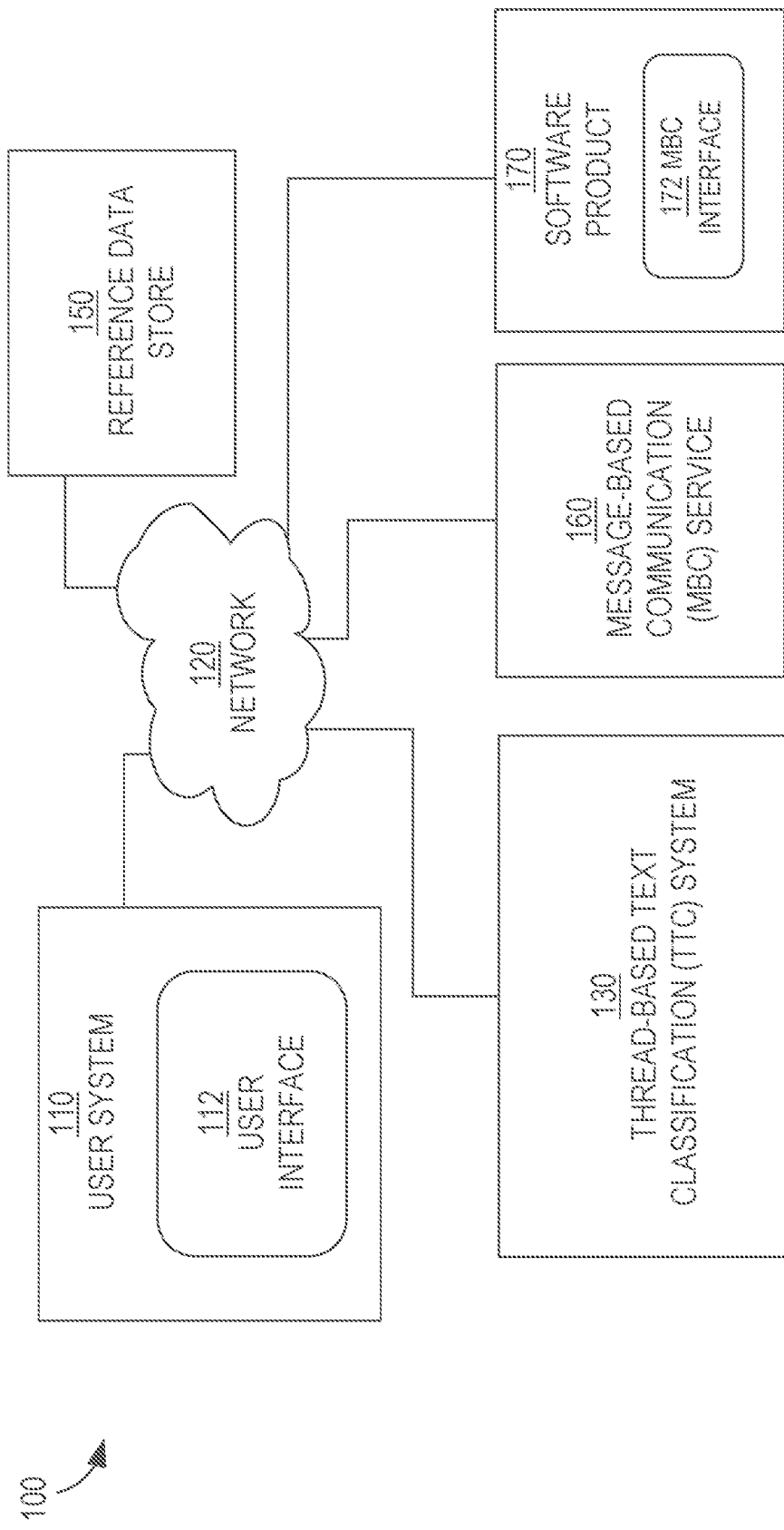
FIG. 1 is a block diagram illustrating at least one embodiment of a computing system in which aspects of the present disclosure may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

1. Technical Problem

Existing sentiment analysis techniques generally work well for short and concise text, such as online movie reviews or survey responses, but not for longer text, such as customer and user support tickets. Attempts to apply existing techniques to analyze the sentiment of support tickets have been unsatisfactory. Additionally, survey response rates are universally poor. Thus, even if existing sentiment analysis techniques are effective in interpreting survey responses, the output of those techniques has low value due to the low number of survey respondents.

The existing approaches thus far have not proven reliable for identifying sentiment in longer text. Examples of longer text include but are not limited to email threads, message threads, and digital customer support tickets, which may have multiple threads related to the same case.

In addition, the existing approaches have not been effective when the text does not include any obvious affect words or when the majority of the text is ambiguous as to affect. Further, sentiment can be very domain specific. An email to customer service, for example, may not include words such as happy, sad, or bored, whereas a text message to a friend might. The customer support email may likely include a question or issue, and the ensuing thread may or may not contain overt sentiment clues as to how the customer feels about the level of service that has been provided. In many cases, a subsequent message from a user to a customer service representative may simply include an attachment that had been requested by the customer support representative, with little or no additional text, and thus the message may have a neutral sentiment. The frequent occurrence of neutral text can skew the sentiment analysis.

2. Technical Challenges

The technical problem outlined above has raised specific technical challenges for distributed computer systems, data processing, and software engineering. It has been a technical challenge for computer software to accurately or reliably predict the sentiment of longer text sequences and/or text sequences that are "unbalanced," predominantly neutral, or ambiguous as to sentiment. Existing sentiment analysis approaches have been applied to this problem unsuccessfully.

Particularly in the software domain, customer support is often provided using message-based communication mechanisms, such as email, text messaging, and chat bots. Moreover, it is not uncommon for customers to express their dissatisfaction (with products, customer service representatives, or the produce support process) on the Internet, including on social media sites. Comments made on web sites or social media often initiate longer threads of discussion. Thus, in the customer support domain and other domains, longer text sequences are frequently available for sentiment analysis.

3. Technical Solutions that Address Technical Challenges

To solve the challenges above, embodiments of the disclosed technologies are structured and programmed to utilize a set of machine-learned models to determine case level and/or thread level sentiment scores for ordered sets of text threads. The set of machine-learned models is configured using a transfer learning approach, in some embodiments. In accordance with the transfer learning approach, a model layer t uses the output of the model layer t−1 as input.

In an embodiment, a deep and wide neural network-based model uses both deep and wide features as inputs. An example of a deep feature is a raw text sequence or a semantic embedding. An example of a wide feature is a domain feature. The deep and wide features are inputs to different portions of the deep and wide model, and the deep and wide model determines case level sentiment scores in response to the input of those features.

In an embodiment, thread-level classifications used as inputs to the deep and wide model correspond to output of a thread level model. An example of a thread level model is a neural network-based model that has been training to classify semantic embeddings using supervised machine learning. The thread level model produces a thread level sentiment classification in response to input of a semantic embedding.

In an embodiment, a semantic embedding is produced by a word embedding model in response to input, into the word embedding model, of a raw text sequence. An example of a word embedding model is an unsupervised machine learning based model as described in more detail below.

4. Benefits

Experiments have shown that the disclosed technologies improve upon existing sentiment analysis functionality. For example, in some experiments, the disclosed technologies have achieved 1-4% better model performance and generalization on sentiment predictions than the more traditional machine learning models mentioned above. In one experiment for thread level sentiment prediction, the disclosed technologies achieved 79.61% overall accuracy for positive, neutral, negative classes, with precision/recall/F1 around 80~82%. In a case level sentiment prediction experiment, the disclosed technologies achieved around 81.50% accuracy overall, with precision/recall/F1 around 81~83%.

5. Terminology

For ease of reference, as used herein, in at least one embodiment:

semantic embedding or word embedding may refer to an encoding, such as a vector, indicative of a semantic meaning of a text sequence;

text sequence may refer to an n-gram, a token, a word, a phrase, a sentence, a chunk, a message, a thread, a case, or any sequence of unstructured natural language text;

unstructured may refer to text that lacks metadata or otherwise cannot readily be indexed or mapped onto database fields or data objects, such as the body of an email message, an instant message, a document, or text entered into a free-form field of a software application;

long text sequence may refer to a thread that has more than about 100 words or a case that has more than about 1,000 words;

unbalanced text sequence may refer to a text sequence that is ambiguous as to sentiment, for example a text sequence that has multiple potentially conflicting text classifications or a text sequence in which a majority of the words have a neutral sentiment;

thread may refer to a text sequence that includes text produced by one or more different user accounts or devices;

case may refer to an ordered set of threads, such as a temporal sequence of threads created during a time interval;

very large corpus may refer to a data set having a size in the range of at least about 2 Gigabytes;

minimally-labeled thread data may refer to a very large corpus of thread data having less than or equal to about 15,000 labeled thread data, with the remainder of the thread training data being unlabeled;

classification data may refer to a qualitative value or a quantitative score selected from a range of valid scores or values, such as integers, real numbers, probabilistic or statistical values, letter grades, text labels such as "positive," "negative" and "neutral," star ratings, integers in the range of [−1, 0, +1] (range includes 3 valid scores) or integers in the range of [−2, −1, 0, +1, +2] (range includes 5 valid scores);

product may refer to a tangible product or a service or a software product that includes computer programming code stored in computer memory that when executed causes a computing device to perform particular functions, and includes any software-based service, such as but not limited to cloud-based services, Internet-based applications or services, local and native software applications, and may further include any product-related services such as customer support, technical support, and provisioning services;

domain feature data may refer to quantitative and/or qualitative data associated with a case, but which is not part of a thread. For example, domain feature data may include structured data or unstructured data, which is automatically or periodically collected or computed, for example by a customer support system, including numerical or categorical data such as initial response time, time to resolution, service level agreement (SLA) met? (Y/N), bug? (Y/N), survey response? (Y/N);

criterion may refer to a threshold value or threshold range of values to which data may be compared to determine whether a condition is met. A criterion is configured according to the requirements of a particular design or implementation of the system. Examples of criteria include "the difference between 2 data values is less than or equal to x" and "data value is greater than x" and "data value is in the range of x to y," and "data value is in the set of [a, b, c]," where x and y may be quantitative or qualitative data values, including text values, raw numerical values or computed values, such as percentiles or statistical or probabilistic values;

model may refer to a combination of computer programming code in which at least one decision-making algorithm is expressed; i.e., a machine learning algorithm, and at least one computer-implemented data structure that stores data and/or data values, such as weights and parameter values, used by the model;

embedding may refer to a machine learning-based process of generating a featurized representation of an input, typically a character-based input such as a word, a phrase, a sentence, or a document, which may be stored in computer memory as a feature vector. Embedding may also be used as a noun to refer to the results of such a process. A feature vector provides information about the input. For example, each dimension of a feature vector for an input word may indicate different semantic information about the word;

instructions may refer to computer programming code stored in computer memory that is capable of being executed by at least one computer processor to cause a device to perform at least one operation or function;

analytics data may refer to data values that are computed on aggregated data over particular time intervals, such as percentages, counts, and statistics;

rendering data may refer to data that is used to cause a display device to render a portion of a graphical user interface, including parameter values such as (x, y) coordinates and dimensions and colors of graphical elements and graphical controls;

user may refer to at least one human person interacting with a computing device, or may refer to an automated process, such as a bot, an autonomous agent, or a robot;

user interface is any type of user interface software, including a graphical user interface or a combination of a voice interface and a graphical user interface. Alternatively or in addition, a user interface may provide an application programming interface (API) or an inter-process communication (IPC) interface that allows executing programs or processes to establish bidirectional or unidirectional data communication connections with other programs or processes;

data store may refer to any implementation of a searchable data store, including but not limited to databases, graphs, trees, and XML (eXtensible Markup Language) files;

connection may refer to a flow of digital information or data communication that is established between two devices on a network by network software communicating with, for example, the devices' operating systems either directly or by a virtual machine. Examples of protocols that may be used to establish a connection include hypertext transfer protocol (HTTP) and secure sockets layer (SSL).

System Overview

FIG. 1 illustrates a computing system in which embodiments of the features described in this document can be implemented. In the embodiment of FIG. 1, computing system 100 includes a user system 110, a thread-based text classification (TTC) system 130, a reference data store 150, a message-based communication (MBC) service 160, and a software product 170.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 may be or include front-end portions of TTC system 130, MBC service 160, and/or software product 170.

User interface 112 is any type of user interface as described above. User interface 112 may be used to view graphical representations of data produced by TTC system 130. User interface 112 may make text threads available for processing by TTC system 130.

A text thread can be created and stored in computer memory as a result of a user operating a front end portion of MBC service 160 via user interface 112. Examples of software applications that may alone or in combination function as MBC service 160 include email, asynchronous text messaging, and social media applications. MBC service 160 may be a part of or accessed by a larger service, such as a customer support service, a product support service, a case management system, a social network application, or an online application such as a web site that allows comments and other types of reactions to be posted in relation to published digital content. MBC service 160 may create a digital "ticket" when a question or concern with a software product 170 is received from a user and store and tracks threads and cases that relate to the ticket.

Software product 170 is any type of software product as described above. Software product 170 includes an MBC interface 172. MBC interface 172 is embodied as computer programming code stored in computer memory that when executed causes a computing device to enable bidirectional communication between software product 170 and MBC service 160. For example, a front end of software product 170 may include a "help" button that when selected causes MBC interface 172 to make a data communication connection between software product 170 and MBC service 160. MBC interface 172 may be implemented as, for example, any type of user interface as described above.

Reference data store 150 includes at least one digital data store that stores data sets used to train, test, use, and tune models that form portions of TTC system 130 or otherwise are used to operate TTC system 130, as described in more detail below. Examples of data that may be stored in reference data store 150 include portions of cases and text threads, metadata, domain feature data, semantic embeddings, classification data, model parameter values, weight values for model layers, criteria, analytics data, rendering data, and model performance metrics. Stored data of reference data store 150 may reside on at least one persistent and/or volatile storage devices that may reside within the same local network as at least one other device of computing system 100 and/or in a network that is remote relative to at least one other device of computing system 100. Thus, although depicted as being included in computing system 100, portions of reference data store 150 may be part of computing system 100 or accessed by computing system 100 over a network, such as network 120.

TTC system 130 analyzes text threads and cases produced by MBC service 160, as described in more detail below. Output produced by TTC system 130 may be provided to MBC service 160 and/or displayed by user interface 112, for example.

A client portion of TTC system 130 and/or MBC service 160 may operate in user system 110, for example as a plugin or widget in a graphical user interface of a software application or as a web browser executing user interface 112. In an embodiment, a web browser may transmit an HTTP request over a network (e.g., the Internet) in response to user input (e.g., entering of a text sequence) that is received through a user interface provided by the web application and displayed through the web browser. A server portion of TTC system 130 and/or MBC service 160 may receive the input, perform at least one operation to analyze the input, and return at least one modified version of the input using an HTTP response that the web browser receives and processes.

Each of user system 110, TTC system 130, and MBC service 160 is implemented using at least one computing device that is communicatively coupled to electronic communications network 120. TTC system 130 is bidirectionally communicatively coupled to user system 110, reference data store 150, and MBC service 160, by network 120. A different user system (not shown) may be bidirectionally communicatively coupled to software product 170. As such, a typical user of user system 110 may be a customer service representative or an administrator or product manager for software product 170, while a typical user of the different user system may be an end user of software product 170. Thus, user system 110 is configured to communicate bidirectionally with at least TTC system 130, for example over network 120. Examples of communicative coupling mechanisms include network interfaces, inter-process communication (IPC) interfaces and application program interfaces (APIs).

The features and functionality of user system 110, TTC system 130, reference data store 150, MBC service 160, and software product 170 are implemented using computer software, hardware, or software and hardware, and may include combinations of automated functionality, data structures, and digital data, which are represented schematically in the figures. User system 110, TTC system 130, reference data store 150, MBC service 160, and software product 170 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Network 120 may be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Example of a Thread Level Sentiment Classification System

Figure 2A:
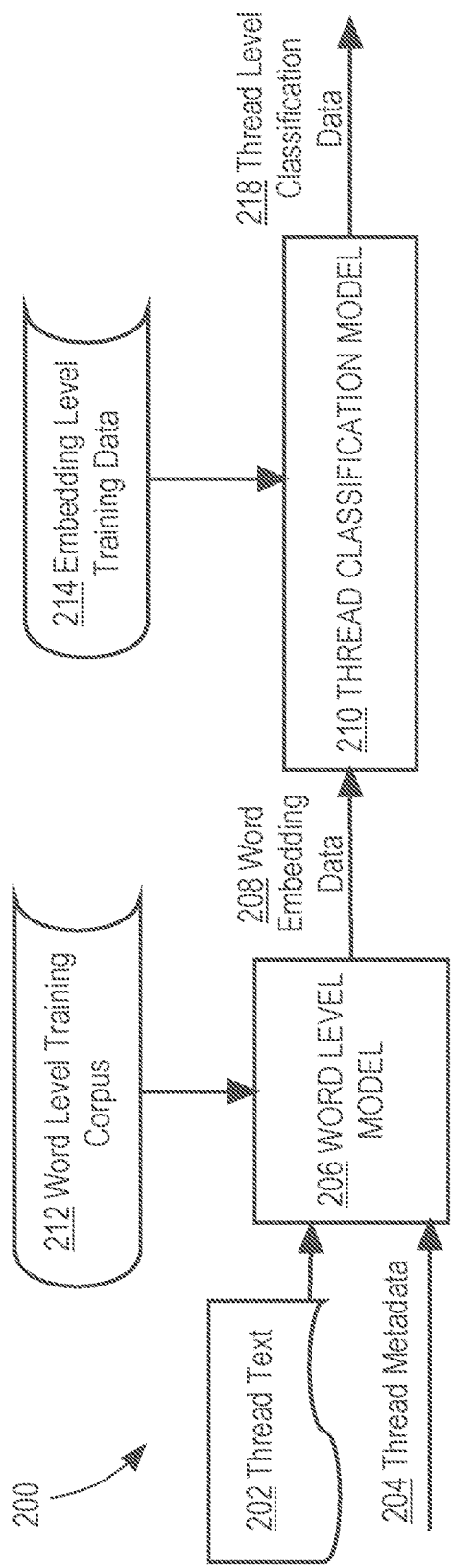
FIG. 2A is a flow diagram of a process that may be executed by at least one device of the computing system of FIG. 1.

FIG. 2A is a simplified flow diagram of an embodiment of operations that can be performed by at least one device of a computing system. The operations of a flow 200 as shown in FIG. 2A can be implemented using processor-executable instructions that are stored in computer memory. For purposes of providing a clear example, the operations of FIG. 2A are described as performed by computing system 100, but other embodiments may use other systems, devices, or implemented techniques.

1. Word Level Model

In flow 200, thread text 202 and thread metadata 204 are input into a word level model 206. An example of thread text 202 is an exchange of emails or voice messages between the user of a product and a customer service representative for the product, which may be referred to as a "verbatim" or "customer verbatim." Another example of thread text 202 is a transcript of a recorded telephone conversation. As such, thread text 202 may contain text provided by one or more contributors, such as the sender of a message and the recipient of the message. Thread text 202 may contain multiple rounds of communicative exchanges between the parties to a conversation about a product.

An example of thread metadata is a unique thread identifier, which is automatically generated by a computer when the thread is created and stored in computer memory. A thread identifier may be generated by the computer using, for example, a random number generator or code generator. When thread is created, thread identifier data is linked with the thread and stored. Thus, a computer can use the thread identifier data to determine the original text of any thread by querying the stored thread identifier data.

Another example of thread metadata 204 is timestamp data. An example of timestamp data is date and time data that is automatically generated by a computer when a thread or an update to a thread is created and stored in computer memory. The date and time stamp data is generated by the computer using data obtained from the computer's system clock. When a contribution of text is added to a thread, timestamp data is linked with the text and stored. Thus, a computer can determine a temporal duration of any thread by subtracting the timestamp data of the first contribution to the thread from the timestamp data of the last or most recent contribution to the thread. Alternatively, the system may detect different threads within a case based on a time period of no activity between the last contribution to the first thread and the first contribution to the second thread; that is, by computing the difference between the timestamp data of two different contributions to a thread and comparing the difference to a threshold value. If the difference exceeds the threshold value, then the system may consider the contributions as belonging to different threads Another example of thread metadata 204 is account identifier data. Examples of account identifier data include user names, network addresses, session identifiers, and device identifiers. When a contribution of text is added to a thread, account identifier data is linked with the text and stored. Thus, a computer can determine the contributor(s) to any portion of a thread or the number of different contributors to any thread by querying the account identifier data for the thread.

Another example of thread metadata 204 is status data. Examples of status data include indications that the thread or the case to which the thread belongs is open or has been resolved. Status data is collected and stored automatically by, for example, MBC service or an overarching customer support system. When a contribution of text is added to a thread or a case, status data may be updated and linked with the text and stored. Thus, a computer can determine the status of a thread or case by querying the status data for the thread or case.

Word level model 206 is a machine learned model that has a training phase and an operational phase. During a training phase, word level model 206 is trained on a word level training corpus 212 using an unsupervised machine learning algorithm. Examples of suitable unsupervised machine learning algorithms include text clustering algorithms such as k-means clustering. Word level training corpus 212 is a very large corpus of unlabeled text threads typically amounting to more than 2.5 Gb of text data.

During the training phase, word level model 206 assigns semantics to individual text threads of the word level training corpus 212 using unsupervised machine learning. To do this, word level model 206 projects and groups words with similar contexts into a multidimensional semantic space, such as an n-dimensional latent space, where n is a positive integer greater than 20, or greater than 100 or in the range of at least about 300.

To improve the generalization of the trained model, portions of word level training corpus 212 may be pre-processed before being input into word level model 206 during the training phase. Words mentioning special entities such as person name, organization name, or location may be replaced with generic tags or otherwise anonymized using, for example, a Named Entity Recognition (NER) model that has been trained using a Conditional Random Fields (CRF) model.

Output of the NER model is added to the training data, for example by concatenation. Thus, the input to the model during the training phase may include both the original text input from the training corpus and the NER model output. As one example, an original text thread may contain the following: "Got it. Thank you for the quick response. James Director Marketing and Communications American Health Partners." After pre-processing, the anonymized text thread that is input into word level model 206 may be anonymized to "Got it. Thank you for the quick response. person director org."

Training data may alternatively or in addition be pre-processed according to case resolution time. In the customer service domain, it may take several hours or even days to resolve an issue with a customer using email. Further, a case may be reopened at a later time. As a result, more recent case threads may be removed from the training data since they could have follow-ups threads added at a later time before they are resolved.

Thread text 202 may be pre-processed and anonymized in a similar manner to the training data, prior to input into word level model 206 during the operational phase.

During the operational phase, in response to input of the thread text 202, alone or in combination with thread meta-data 204, the trained word level model 206 outputs word embedding data 208. An example of word embedding data 208 is a multidimensional vector, where each dimension of the vector represents a different piece of semantic information about thread text 202 and/or individual words in thread text 202. The number of dimensions in word embedding data 208 corresponds to the size of the semantic space that is learned from word level training corpus 212 during the training phase for word level model 206.

As an example, a dimension may be assigned a certain value, such as "1," if word level model 206 determines with a high degree of confidence (mathematically determined using, for example, a probability) that a particular semantic tag applies to a particular word of thread text 202. For instance, "got it" can be interpreted multiple different ways, including as "I understand" or "I have received that thing." If word level model 206 determines that "got it" means "I understand," then word level model 206 assigns the appropriate value to that dimension of the semantic embedding vector.

Semantic embedding data is also useful for particularizing sentiment classifications. For example, semantic embedding data can be used to associate a thread or a case with a particular product or a particular product feature, even if that particular product or feature is not explicitly stated in the text. As a result, data analytics can be visualized at finer levels of granularity, to reveal sentiment by product or by feature, for instance.

In some embodiments, portions of word level model 206 are made fine-tunable. Fine tuning means that during training, some model parameters are held static while other model parameters are permitted to change. Fine tuning may help make the model more explainable.

2. Thread Classification Model

Figure 4A:
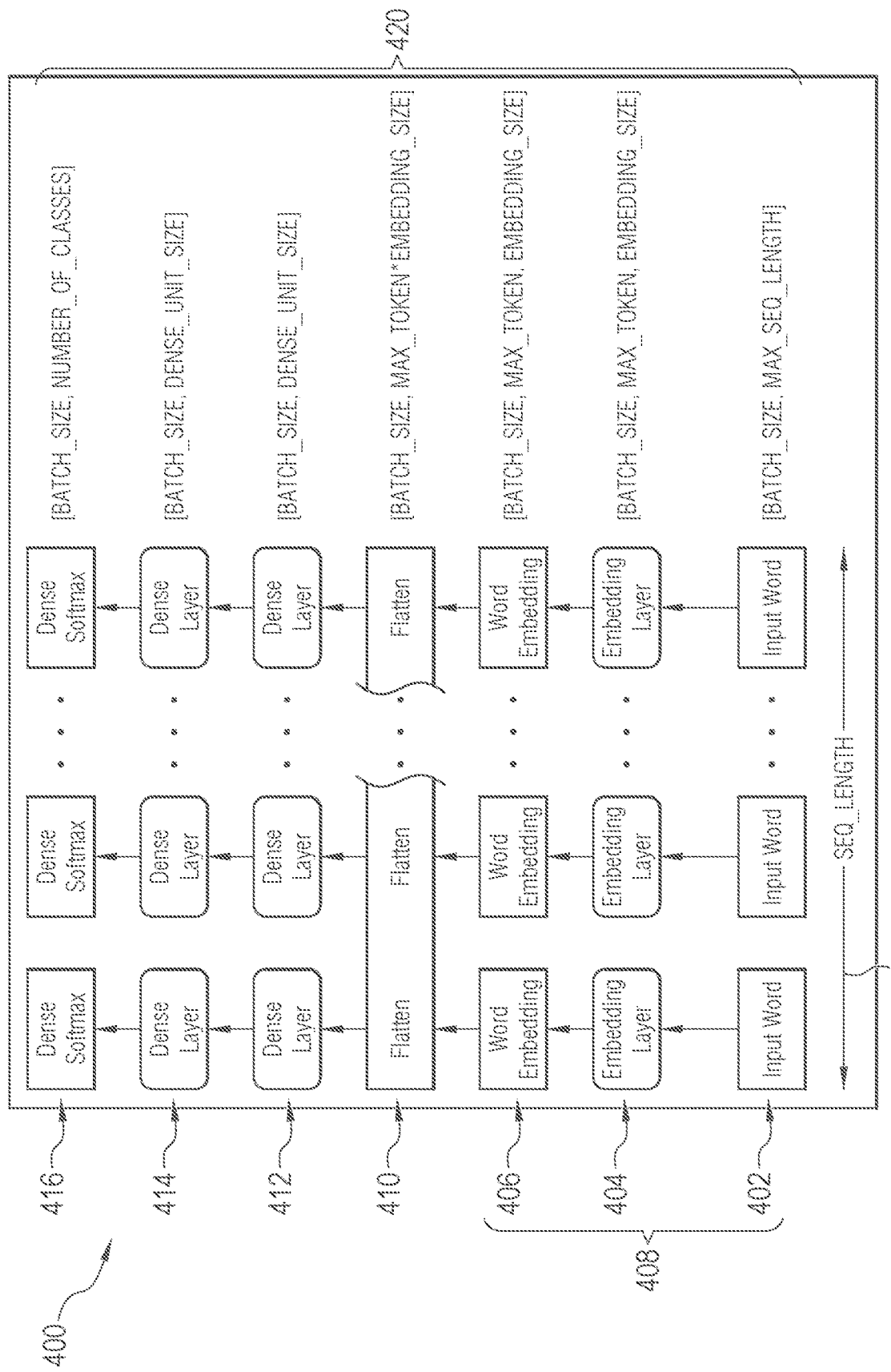
FIG. 4A and FIG. 4B are schematic diagrams of embodiments of at least one device of the computing system of FIG. 1.

Word embedding data 208 produced by word level model 206 is input into a thread classification model 210. Thread classification model 210 is a machine learned deep neural network based model that has a training phase and an operational phase. During a training phase, thread classification model 210 is trained on embedding level training data 214 using a supervised machine learning algorithm. Examples of suitable supervised machine learning algorithms include support vector machines such as non-linear support vector machines. An example of a model architecture for thread classification model 210 is shown in FIG. 4A, described below.

Embedding level training data 214 is a dataset of minimally labeled text threads. Embedding level training data 214 may be created using word level training corpus 212 and corresponding word embedding data produced during the training phase for word level model 206. Thus, the output of word level model 206 may be used to train thread classification model 210. A subset of this training data is labeled, for example by human annotation, with sentiment classifications using a selected classification scheme.

For example, certain instances of training data are labeled with one of three sentiment labels: positive, negative, or neutral, while the remaining instances of training data in the corpus remain unlabeled. Thus, after labeling, an instance of embedding level training data 214 may include an original text thread, a semantic embedding of that text thread, and a sentiment label, while another instance of embedding level training data 214 may include only the original text thread and the corresponding semantic embedding. Alternatively, the original text may be omitted from embedding level training data 214 such that embedding level training data includes only the semantic embedding for a particular text thread, a thread identifier, and optionally, a sentiment label. It should be noted that the results of any pre-processing performed on the original text thread, such as anonymization, may be incorporated into the semantic embedding.

As a quality control measure, certain instances of training data may be filtered out of embedding level training data after the sentiment annotations have been added. For example, a thread or instance of training data may be labeled independently by 3 different human annotators. If at least two of the human annotators have assigned the same label to the same thread of training data (e.g., 2 votes for positive and 1 vote for neutral, or 3 votes for negative), then the instance is retained in the training dataset and the majority label is assigned to the instance. If there is not a majority opinion (50% or more) as to the sentiment of a training instance (e.g., 1 vote for positive, 1 vote for neutral, 1 vote for negative), then that instance is removed from the training data set.

If a particular thread of training data includes very long text, for example larger than 1000 words, then the raw text of the thread is replaced with highlighted text to remove noise from the training data. Highlighted text is a subset of the raw text. Highlighted text is identified by the computer determining and selecting thread text that has the closest thread level sentiment score to the case level sentiment score for the case to which the thread belongs.

During the operational phase, in response to input of the word embedding data 208, alone or in combination with thread metadata 204, the trained thread classification model 210 outputs thread level classification data 218. An example of thread level classification data 218 is a probabilistic estimation of the likelihood that a particular sentiment label selected from a set of valid labels applies to a particular thread. The set of valid sentiment labels corresponds to the set of sentiment labels that was used during the training phase for thread classification model 210.

An example of a probabilistic estimation is a numerical value between 0 and 1, inclusive, where a value closer to 1 indicates a high likelihood that a sentiment label accurately represents the sentiment of a particular thread and a value closer to 0 indicates a low likelihood that the sentiment label accurately represents the sentiment of the particular thread.

Figure 2B:
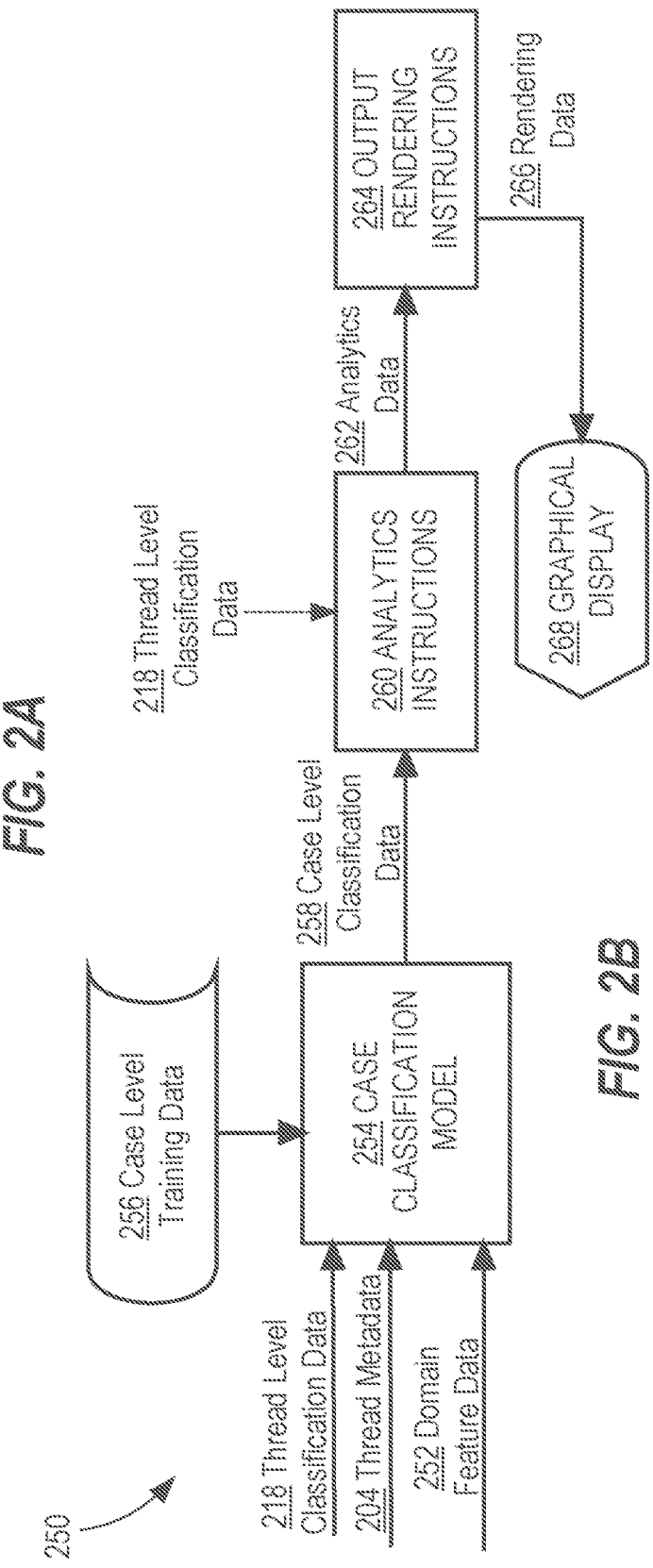
FIG. 2B is a flow diagram of another process that may be executed by at least one device of the computing system of FIG. 1.

Thread level classification data 218 may be used as input to case level classification model 254, described below, or output for use by other components of TTC system 130, such as analytics instructions 256 as shown in FIG. 2B, described below.

Example of a Case Level Sentiment Classification System

FIG. 2B is a simplified flow diagram of an embodiment of operations that can be performed by at least one device of a computing system. The operations of a flow 250 as shown in FIG. 2B can be implemented using processor-executable instructions that are stored in computer memory. For purposes of providing a clear example, the operations of FIG. 2B are described as performed by computing system 100, but other embodiments may use other systems, devices, or implemented techniques.

In flow 250, thread level classification data 218, which may be produced by thread classification model 210 of FIG. 2A, is input into a trained case classification model 254. Other inputs to case classification model 254 include thread metadata 204 and domain feature data 252.

Figure 4B:
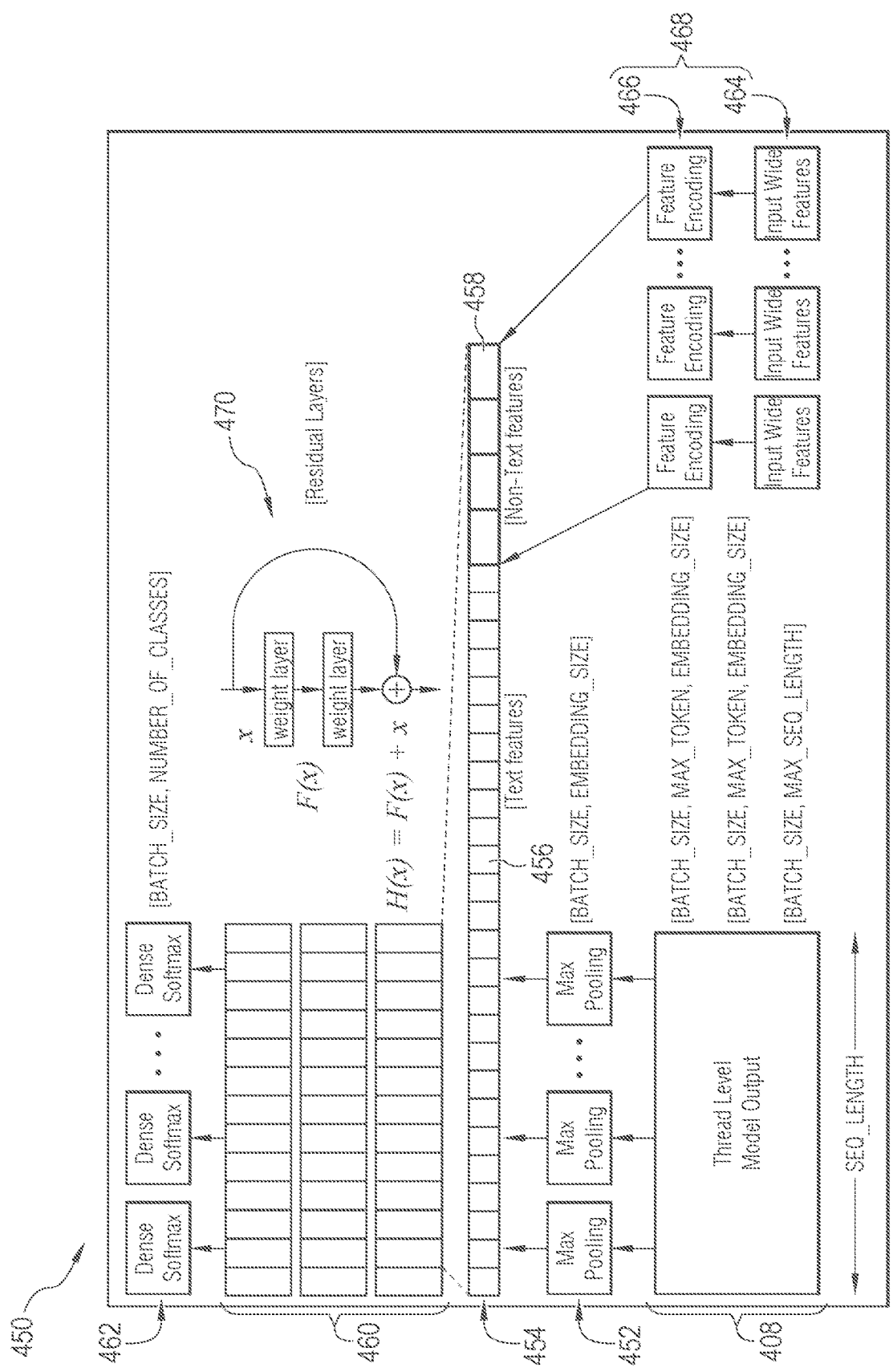

Case classification model 254 is a machine learned deep and wide neural network based model that has a training phase and an operational phase. During a training phase, case classification model 254 is trained on case level training data 256 using a supervised machine learning algorithm. Examples of suitable supervised machine learning algorithms include gradient boosting machines such as those provided by the XG BOOST open source software library. An example of a model architecture for case classification model 254 is shown in FIG. 4B, described below.

Case level training data 256 includes ordered sets of thread level classification data 218, where an ordered set of thread level classification data contains thread level classification data for a sequence of text threads, such as all of the threads in a particular case, where a case may be defined by a time interval. Case level training data 256 also includes domain feature data 252 for the particular case. Thread metadata 204 is used to create the case level, ordered sets of thread level classification data and domain feature data 252. For example, a computer may query a database for all thread level classification data having particular account identifier data and particular timestamp data.

Once an ordered set of thread level classification data has been created, the computer may create and store a unique case identifier to the ordered set of thread level classification data. The case identifier may be created using, for example, a code generator or random number generator. Once a case has been created, domain feature data 252 can be assigned to the case by associating the case identifier with the corresponding domain feature data 252.

Case classification model 254 has a deep portion and a wide portion. During the training phase, the deep portion of the model is training using the ordered sets of thread level classification data 218, while the wide portion of the model is trained using the domain feature data 252 and, optionally, the ordered sets of thread level classification data 218. In some embodiments, the deep portion of case classification model 254 is thread classification model 210, and the wide portion of case classification model 254 is a wide model that takes as inputs domain feature data.

During the operational phase, the trained case classification model 254 outputs case level classification data 258 in response to input of the thread level classification data 218 and domain feature data 252 for a particular case. An example of case level classification data 258 is a probabilistic estimation of the likelihood that a particular sentiment label selected from a set of valid labels applies to a particular case. The set of valid sentiment labels corresponds to the set of sentiment labels that was used during the training phase for thread classification model 210.

An example of a probabilistic estimation is a numerical value between 0 and 1, inclusive, where a value closer to 1 indicates a high likelihood that a sentiment label accurately represents the sentiment of a particular case and a value closer to 0 indicates a low likelihood that the sentiment label accurately represents the sentiment of the particular case.

Case level classification data 258 may be used, alternatively or in addition to thread level classification data 218, as input to analytics instructions 260. Examples of analytics instructions 260 include data analytics software modules that aggregate and interpret large amounts of data. Examples of functions that may be performed by analytics instructions 260 include counting the number of positive, neutral and negative sentiment predictions at the thread level and/or the case level over particular time intervals or for particular products or for particular features of products. Other examples of functions that may be performed by analytics instructions 260 include computing percentages or statistics, such as the percentage of threads or cases that have a positive, negative, or neutral sentiment prediction.

In response to input of case level classification data 258 and/or thread level classification data 218, analytics instructions 260 outputs analytics data 262. Analytics data 262 includes the output of the analytics functions performed by analytics instructions 260. Analytics data 262 includes, for example, counts of the number of positive, neutral and negative sentiment predictions at the thread level and/or the case level over particular time intervals and/or for particular products and/or for particular features of products, and percentages or statistics, such as the percentage of threads or cases having a positive, negative, or neutral sentiment prediction.

A user of TTC system may periodically request graphical visualizations of analytics data 262. When the system receives such a request, a selected subset of analytics data 262 is input to output rendering instructions 264. Output rendering instructions 264 determines and adds rendering data 266 to the selected subset of analytics data 262 to produce rendering data 266. Rendering data 266 contains parameter values, such as titles, scales, and coordinate data, and other graphical user interface data, such as the size, color and shape of various graphical elements and graphical controls.

Figure 5A:
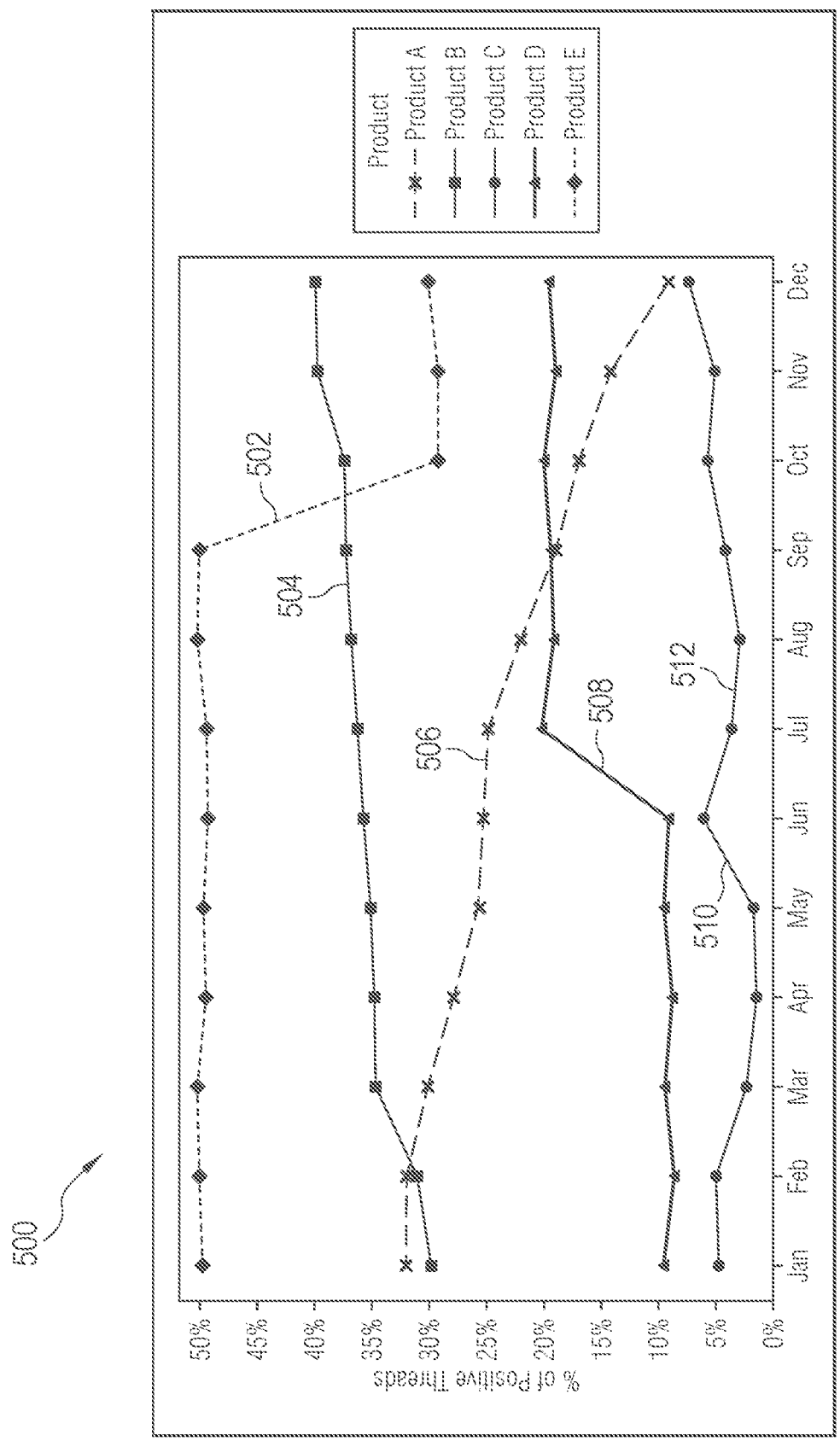
FIG. 5A, FIG. 5B, and FIG. 5C are example screen captures of displays on computer display devices that may be implemented in at least one embodiment of the computing system of FIG. 1.
Figure 5B:
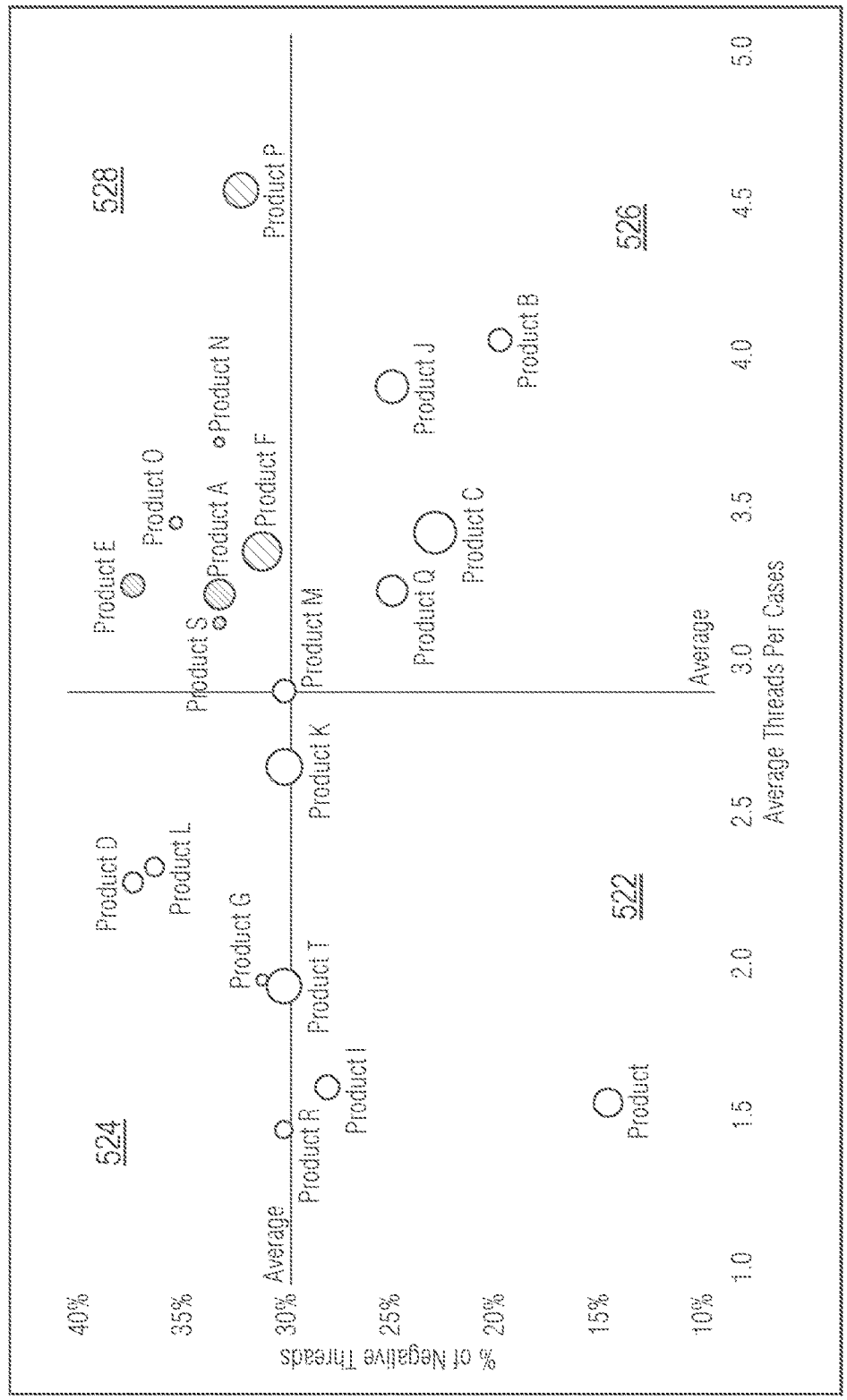
Figure 5C:
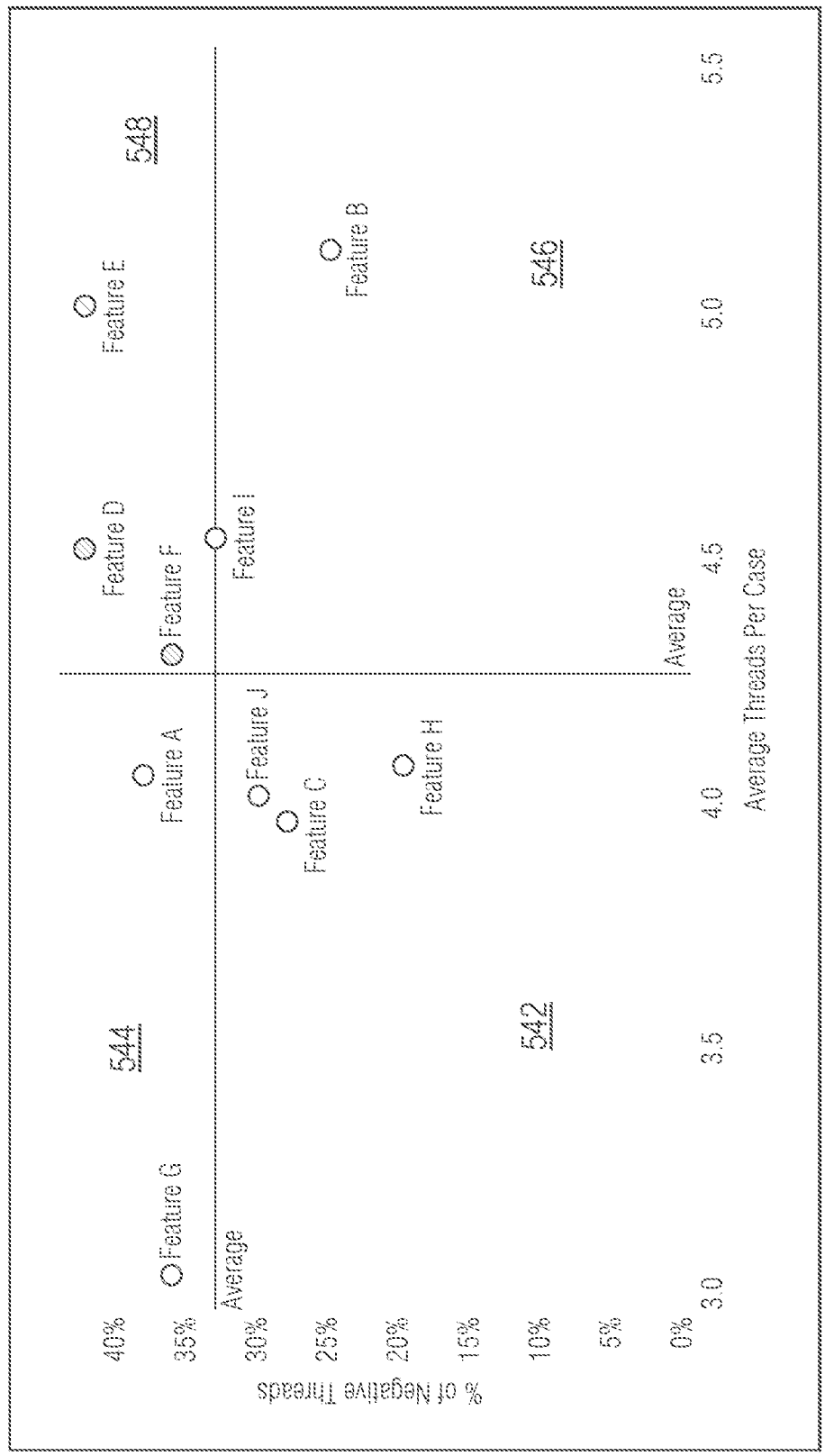

Rendering data 266 is used to display the requested visualization of analytics data 262 on a graphical display 268. Graphical display 268 may be a component of user system 110. Examples of output that may be generated and displayed by graphical display 268 are shown in FIG. 5A, FIG. 5B, and FIG. 5C, described below.

Example of a Thread-Based Sentiment Classification Process

Figure 3:
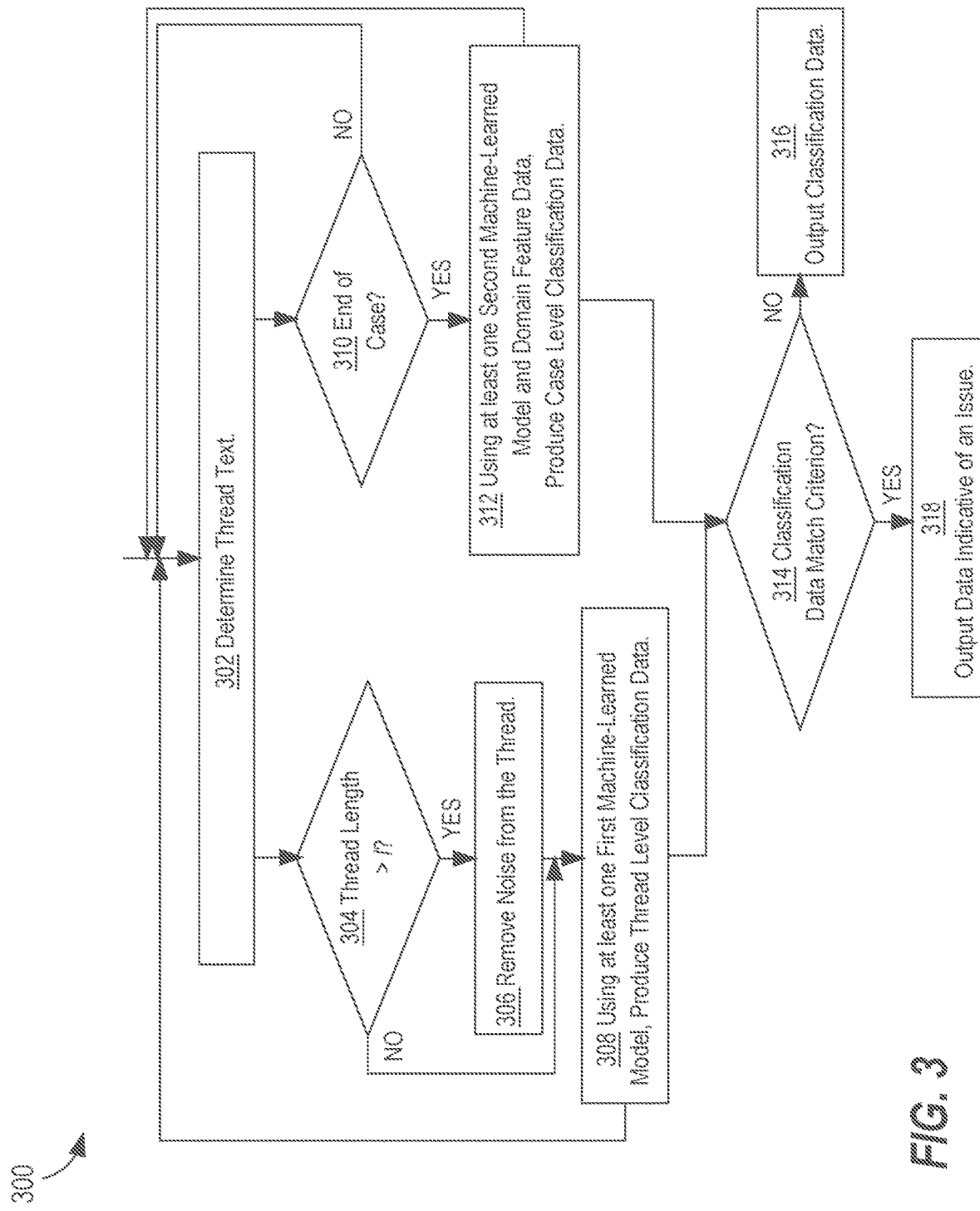
FIG. 3 is a flow diagram of another process that may be executed by at least one device of the computing system of FIG. 1.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems, devices, or implemented techniques.

Operation 302 when executed by at least one processor causes one or more computing devices to determine thread text. Operation 302 involves, for example, reading unstructured natural language text of the body of an email or text message and determining associated metadata, such as timestamp data and account identifier data. Operation 302 may involve reading a sequence of text until a separator signal is detected. Examples of separator signals include end of sentence marks like punctuation, end of paragraph signals, end of document signals, and end of message signals.

Operation 304 when executed by at least one processor causes one or more computing devices to determine whether the thread text determined by operation 302 has a length that is longer than a threshold length l, where l is a positive integer in the range of about 100 or more words. If the thread length exceeds l, flow 300 proceeds to operation 306. If the thread length does not exceed l, flow 300 skips operation 306 and proceeds to operation 308.

Operation 306 removes noise from the thread text determined by operation 302. To do this, operation 306 selects a subset of the thread text sentiment analysis and removes the remaining portions of the thread text. To select the subset of the thread text, operation 306 highlights words in the thread text that have the closest sentiment score to the case level sentiment score determined thus far for the case, and includes those highlighted words in the subset of the thread text that is to be processed by operation 308. For example, in an embodiment, highlighted text is part of the labeled training data. For instance, in a thread, a user's text includes: "I am using LinkedIn premium service, and it offers me . . . , I really like the premium service, it is awesome." The thread could be very long, but when labeling this as positive, a part of the text that shows real sentiment is highlighted, e.g., "I really like the premium service, it is awesome." In this case, the thread level model is training using the highlighted text instead of the full raw text of the thread. When training the case level sentiment model, since it may have a lot of threads, and the concatenated text could be very long, using only the highlighted text in training causes the model to learn better. In some embodiments, case level model takes thread level model output as an additional feature, which means, for example, one case has threads 1, 2, 3, 4, 5. For each thread, the thread level model has output [neutral, neutral, positive, neutral, positive], where the neutral threads 1, 2, 4 are noise for the case level model. To have good input features for the training phase, only the text from 3, 5 are used to train the model. During the operational phase (inference), the same logic is used.

Operation 308 when executed by at least one processor causes one or more computing devices to produce thread level classification data. To do this, operation 308 inputs, into a first machine learned model, the output of operation 302 or operation 306, as the case may be. The first machine learned model outputs the thread level classification data. An example of the first machine learned model is thread classification model 210, described above. Thus, operation 308 may include any of the operations described as being performed by thread classification model 210. Following operation 308, flow 300 may return to operation 302 to process a subsequent text thread.

Operation 310 when executed by at least one processor causes one or more computing devices to determine whether an end of case signal has been encountered. To do this, operation 310 may continue reading portions of an email thread or a text message thread that have been received subsequently to the thread text processed by operations 304, 306, and 308. An example of an end of case signal is an explicit indication in thread metadata that a thread is the last thread of a case. End of case signals may be created automatically by a customer support system when a support ticket is closed or resolved, for example. If an end of case signal is detected, then flow 300 proceeds to operation 312. If an end of case signal is not detected, then flow 300 returns to operation 302 to read additional thread text.

Operation 312 when executed by at least one processor causes one or more computing devices to produce case level classification data. To do this, operation 312 inputs, into a second machine-learned model, the output of operation 308 for all threads of the case detected by operation 310 plus the domain feature data associated with the case. The first machine-learned model outputs the thread level classification data. An example of the second machine-learned model is case classification model 254, described above. Thus, operation 312 may include any of the operations described as being performed by case classification model 254.

Following operation 308 and/or operation 312, flow 300 proceeds to operation 314. Operation 314 when executed by at least one processor causes one or more computing devices to determine whether the classification data produced by operation 308 and/or operation 312, as the case may be, matches a criterion.

Operation 314 may, for a particular thread, determine whether the thread level classification data exceeds a threshold confidence value for any sentiment label in a set of valid sentiment labels. For instance, if the thread level classification data for a particular thread for a negative sentiment label exceeds a thread level confidence criterion, such as 0.5 or higher on a scale of 0 to 1, inclusive, operation 314 may proceed to operation 318. If the thread level classification data for a particular thread for a negative sentiment label does not exceed the thread level confidence criterion, operation 314 may proceed to operation 316.

Alternatively or in addition, operation 314 may, for a particular case, determine whether the case level classification data exceeds a threshold confidence value for any sentiment label in the set of valid sentiment labels. For instance, if the case level classification data for a particular case for a positive sentiment label falls below a case level confidence criterion, such as 0.49 or lower on a scale of 0 to 1, inclusive, operation 314 may proceed to operation 318. If the case level classification data for a particular case for a positive sentiment label exceeds the case level confidence criterion, operation 314 may proceed to operation 316.

Operation 316 when executed by at least one processor causes one or more computing devices to output the thread level classification data and/or case level classification data, as the case may be. Examples of output that may be produced by operation 316 are shown in FIG. 5A, FIG. 5B, and FIG. 5C, described below.

Operation 318 when executed by at least one processor causes one or more computing devices to output data indicative of an issue relating to the subject matter of the text thread or the case. Examples of issues include customer dissatisfaction or customer confusion, and indications of product failures. Examples of output that may be produced by operation 318 include those particular portions of FIG. 5A, FIG. 5B, and FIG. 5C that indicate issues, as described below. Other examples of output that may be produced by operation 318 include push notifications or instant messages sent to customer service representatives involved in the thread or case. In this way, a customer service representative may be promptly alerted to an issue.

Portions of flow 300 may be repeated if there are additional text threads or cases. As such, flow 300 may return to operation 302 following operation 308 or operation 310 or operation 312.

Implementation Example—Thread-Level Model

FIG. 4A is a schematic diagram of an arrangement of software-based components that may be stored on at least one device of the computing system of FIG. 1, including examples of inputs and outputs. FIG. 4A shows a portion of a digital model 400, which may be a component of the system of FIG. 1, in an embodiment.

Digital model 400 is an artificial neural network implemented using computer programming code and stored digital data. More specifically, digital model 400 is a deep neural network, which is trained using a supervised machine learning technique.

In FIG. 4A, rectangular boxes with square corners, of layers 402, 406, 410, and 416, represent inputs and outputs, rectangular boxes with rounded corners, of layers 404, 412, and 414 represent cells, and area 420 indicates model parameters that are used at each layer. A cell executes at least one function, which may be referred to as a transfer function or an activation function, on the input, and outputs at least one output. The type of function used by a particular layer is determined by the model type.

For example, a cell may execute an algorithm, such as a linear transformation of its inputs followed by a sigmoid or tan h function, using a set of model parameters and weight values. Another algorithm, such as a SoftMax function, can be applied to the output of a cell to make a classification prediction. A SoftMax function outputs a probability that a given input matches a given ground truth. The ground truth is, for example, a sentiment score or a distribution of sentiment scores established by the model training.

The model parameters include weight values, such as coefficients, which are used by the function at a particular layer and are learned through model training. Examples of parameters include, for a logistic regression algorithm, a weight value W and a bias value b.

Model parameter values, such as the values for W and b, may be different at each layer and the parameter values for each layer may be adjusted after each training iteration until the algorithm converges. For example, during the training phase, a training algorithm may execute a loss function, which measures, for a particular instance of training data, how close the model's prediction is to the ground truth value. The model parameters may be learned or adjusted based on the output of the loss function.

Hyperparameters are model parameters that are set as part of the model design. During model training, the values of the hyperparameters may influence the values of other parameters, for example W and b, at each layer. The hyperparameters, for example number of epochs and learning rate, are determined by the nature of the classification problem and may be adjusted based on experimentation.

In FIG. 4A, the cells are arranged into columns and rows. Each column corresponds to a different input or time step, and each row indicates a different layer. Thus, the number of columns or width of the model is defined by the length of the input data, e.g., sequence length 418. The number of rows or length of the model is defined by the number of layers. Sequence length 418 corresponds to the number of words in an input text sequence 402. It should be understood that the depiction of digital model 400 has been simplified for ease of discussion. An actual implementation of digital model 400 may include any number of layers and time steps.

Input text sequence 402 may be a thread such that the sequence length 418 corresponds to the length of the thread. Each word in input text sequence 402 is input to and processed by a cell of an embedding layer 404. Embedding layer 404 outputs word embeddings 406 in response to the input text sequence 402. Embedding layer 404 may be implemented using, for example, word level model 206, described above. Word embeddings 406 may correspond to word embedding data 208, described above. In FIG. 4A, the units of input text sequence 402 are words, but they could be tokens or other forms of text sequences.

Flattening layer 410 consolidates the word embeddings 406 into a single vector using, for example, pooling or concatenation.

Dense layers 412, 414 use a scoring function such as the SoftMax function to learn and determine the relationships between word embeddings and sentiment scores, where the relationships are represented by weight values. That is, if the model determines through training that a word embedding or a particular dimension of an embedding strongly influences a particular sentiment score, a weight value associated with that word embedding or dimension may be larger than a weight value associated with another word embedding or dimension that is not strongly correlated with that same sentiment score.

During the training phase, dense layers 412, 414 are trained with labeled training data; that is, training examples of text sequences or their corresponding word embeddings and the associated ground-truth sentiment scores. As a result, dense layers 412, 414 learn the function, e.g., its weight values, that fits particular input vectors to particular sentiment scores.

It should also be noted that as a result of the training phase, model 400 learns the ordering of particular sentiment scores as well as correlations between particular inputs and particular scores. That is, model 400 learns through training that a neutral sentiment score is hierarchically higher or more favorable than a negative sentiment score, and a positive sentiment score is hierarchically higher or more favorable than a neutral sentiment score.

During the operational phase, dense layer 412 is a hidden layer and dense layer 414 outputs a final set of sentiment scores for the input. FIG. 4A shows dense layer 414 outputting individual sentiment scores for each input word in the input text sequence 402, but it is also possible for dense layer 414 to output a single sentiment score for the flattened input vector 410, thereby producing a thread level sentiment score rather than a sequence of word level sentiment scores.

Implementation Example—Case-Level Model

FIG. 4B is a schematic diagram of an arrangement of software-based components that may be stored on at least one device of the computing system of FIG. 1, including examples of inputs and outputs. FIG. 4B shows a portion of a digital model 450, which may be a component of the system of FIG. 1, in an embodiment.

Digital model 450 is an artificial neural network implemented using computer programming code and stored digital data. More specifically, digital model 450 is a deep and wide neural network, which is trained using a supervised machine learning technique.

Digital model 450 includes a deep portion, which includes layers 408, 452, 454, 460, 462 and a wide portion, which includes layers 468, 458, 460, 462. It should be understood that the depiction of digital model 450 has been simplified for ease of discussion. An actual implementation of digital model 450 may include any number of layers and features or time steps.

In the deep portion of digital model 450, a max pooling layer takes as input thread level model output 408. Thread level model output 408 is the final output of digital model 400, for example. Max pooling layer 452 removes noise from thread level model output 408, for example by filtering out less significant word features like stop words, extracts the most significant features from the thread level model output 408, and outputs a final set of text feature data 456.

In the wide portion 468 of digital model 450, wide features 464 are input into a feature encoding layer. Examples of wide features 464 are domain feature data, described above. Feature encoding layer 466 embeds the wide features 464 into a domain-specific semantic space. In doing so, feature encoding layer 466 performs a semantic interpretation of the wide features 464 that is domain-specific. For example, an acceptable time to resolution may be much longer for software product customer support than for other types of customer service. Feature encoding layer 466 outputs a set of non-text feature data 458.

Text feature data 456 and non-text feature data 458 are combined, for example by concatenation, to produce a joint vector 454. Joint vector 454 is, in an embodiment, a vector that has at least in the range of about 1,000 dimensions. Joint vector 454 is input into a set of residual layers 460. The set of residual layers 460 learns the parameters of a residual function 470, which establishes the relationships between the combinations of features represented by joint vectors 454 and sentiment scores output by dense layer 462 for those joint vectors 454. It should be understood that the set of residual layers 460 does not necessarily include 3 layers, but 3 layers are shown for illustrative purposes. The set of residual layers 460 may include one or more layers. The set of residual layers 460 can boost model performance, particularly for deep models with many layers. For shallower models, the set of residual layers 460 may be replaced with a regression model or may be omitted.

The architecture of digital model 450 allows transfer learning techniques to be used to transfer the semantics learned by digital model 400 to the sentiment analysis task for the text features. The model architecture of digital model 450 also allows combinations of text features and non-text features to be used for sentiment analysis.

Implementation Example—Graphical User Interface

FIG. 5A, FIG. 5B, and FIG. 5C are example screen captures of displays on computer display devices that may be implemented in at least one embodiment of the computing system of FIG. 1. For example, displays such as those shown in FIG. 5A, FIG. 5B, and FIG. 5C may be shown on a dashboard of TTC 130, a customer support system or a customer relationship management (CRM) system.

FIG. 5A illustrates an example of a screen 500. Screen 500 is a 2-dimensional line graph style plot of analytics data derived from thread level classification data produced using the techniques described herein. More specifically, screen 500 shows plots of the percentage of positive threads (threads predicted as having a positive sentiment using the disclosed thread level techniques) over time for 5 different products. The graphical visualization of screen 500 shows upward trends in the percentage of positive threads, such as trends 504, 508, 510, and downward trends, such as trends 502, 506, 512, aligned with time.

FIG. 5B shows an example of a screen 520. Screen 520 is a bubble plot of case level classification data produced using the techniques described herein at the product level. In screen 520, the x axis is the average number of threads per case and they axis is the percentage of negative threads in the case. Each bubble in the plot represents sentiment classification data for a particular product. The size (e.g., diameter) of a particular bubble represents the number of cases associated with the particular product.

The plot of screen 520 is divided into quadrants 522, 524, 526, 528. The shading of bubbles in quadrant 528 indicates at least one product-related issue. Products in quadrant 528 have both a high average number of threads per case and a high percentage of negative threads. In contrast, quadrant 522 indicates products having both a low average threads per case and a low percentage of negative threads. Quadrant 524 indicates products having a high percentage of negative threads, and quadrant 526 indicates products having a high average number of threads but a low percentage of negative threads. A determination of whether particular sentiment classification data indicates an issue is domain specific. For example, in other applications, products plotted in quadrant 522 may be shaded, indicating an issue.

FIG. 5C shows an example of a screen 540. Screen 540 is bubble plot of case level classification data produced using the techniques described herein at the level of product features. In comparison to FIG. 5B, a feature plotted in FIG. 5C may be present in multiple different products. In screen 540, the x axis is the average number of threads per case and the y axis is the percentage of negative threads in the case. Each bubble in the plot represents sentiment classification data for a particular feature. The size (e.g., diameter) of a particular bubble may represent the number of cases associated with the particular feature.

The plot of screen 540 is divided into quadrants 542, 544, 546, 548. The shading of bubbles in quadrant 548 indicates at least one feature-related issue. Features in quadrant 548 have both a high average number of threads per case and a high percentage of threads. In contrast, quadrant 522 indicates features having both a low average number of threads per case and a low percentage of negative threads. Quadrant 524 indicates features having a high percentage of negative threads, and quadrant 526 indicates features having a high average number of threads per case but a low percentage of negative threads. A determination of whether particular sentiment classification data indicates an issue is domain specific. For example, in other applications, features plotted in quadrant 522 may be shaded, indicating an issue.

The ability to generate graphical visualizations of sentiment classification data such as those shown in FIG. 5A, FIG. 5B, and FIG. 5C, and to drill down to the product and feature level, is provided at least in part by the model architectures and sentiment analysis techniques disclosed herein. Visualizations such as these can be used to measure and track the reception to a new product launch, for example, and to identify high value features that may be leveraged across multiple different products.

Implementation Example—Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
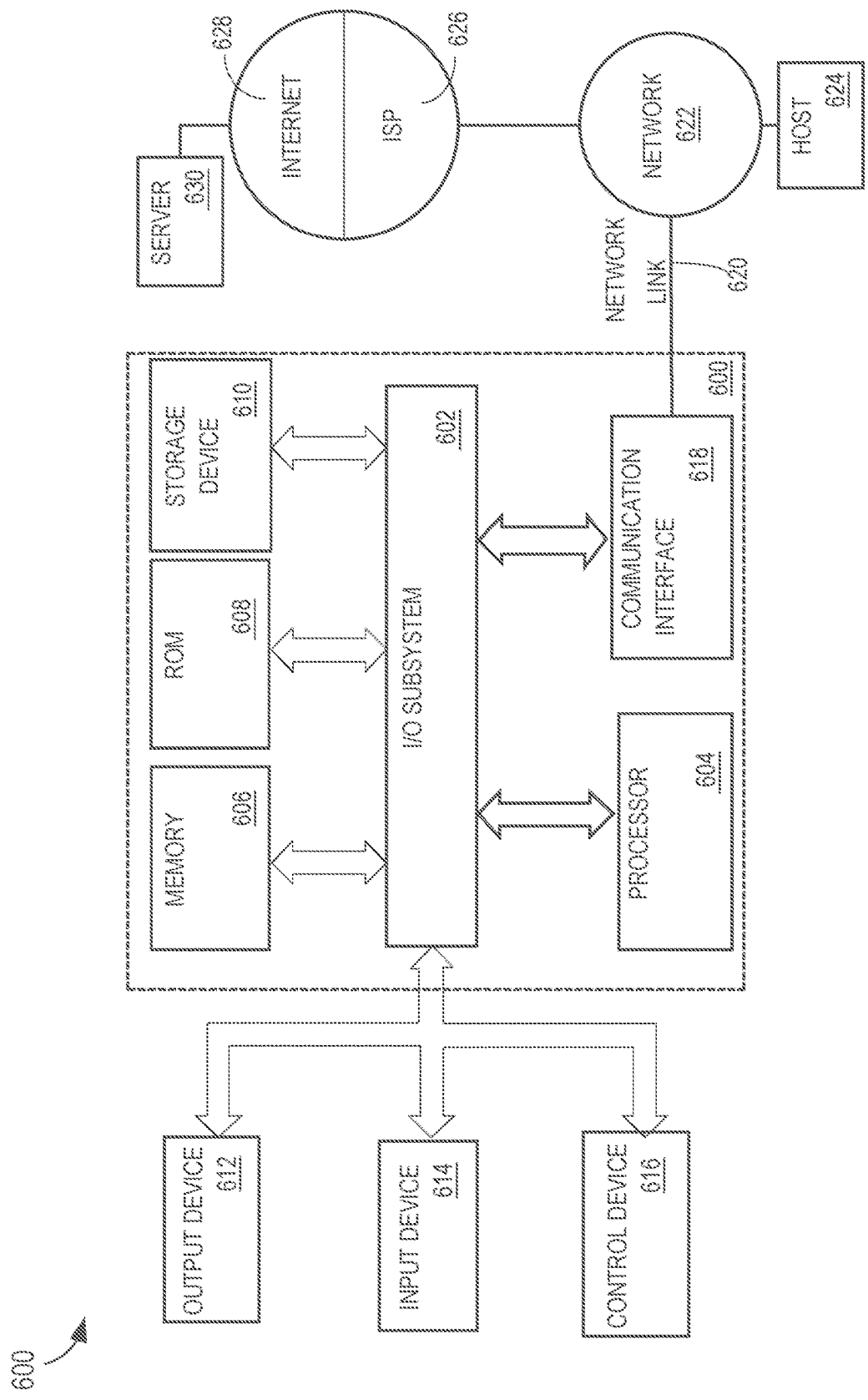
FIG. 6 is a block diagram illustrating an embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 and further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying at least one sequence of instruction to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP) 626. ISP 626 in turn provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 530 might transmit a requested code for an application program through Internet 628, ISP 626, local network 622 and communication interface 618. The received code may be executed by processor 604 as it is received, and/or stored in storage device 610, or other non-volatile storage for later execution.

Additional Examples

Illustrative examples of the technologies disclosed herein are provided below. An embodiment of the technologies may include any of the examples or a combination of the described below. In an example 1, a method for detecting an issue relating to a service or software, includes: determining, in response to input of a text thread into a first machine-learned model, by the first machine-learned model, semantic embedding data for the text thread; the text thread indicative of at least one communication that has occurred relating to the service or software; determining, in response to input of the semantic embedding data into a second machine-learned model, by the second machine-learned model, thread level sentiment classification data; the thread level sentiment classification data indicative of a first score of a set of ordered scores; determining, in response to input of at least thread level classification data for a case and domain feature data into a third machine-learned model, by the third machine-learned model, case level sentiment classification data; the case comprising a sequence of text threads; the domain feature data relating to the service or software but not part of the text thread; the case level sentiment classification data indicative of a second score of the set of ordered scores.

An example 2 includes the subject matter of example 1, and further includes the first machine-learned model having been trained by applying machine learning to a corpus of word level training data. An example 3. includes the subject matter of example 1 or example 2, and further includes the second machine-learned model including a first neural network that has been trained by applying supervised machine learning to labeled embedding level training data. An example 4 includes the subject matter of any of examples 1-3, and further includes the third machine-learned model having been trained using a second neural network. An example 5 includes the subject matter of any of examples 1-4, and further includes, when at least one of the thread level sentiment classification data or the case level sentiment classification data satisfies a criterion, causing a graphical user interface to present data indicative of the issue with the service or software. An example 6 includes the subject matter of any of examples 1-5, and further includes, when the at least one of the thread level classification data or the case level classification data does not satisfy the criterion, causing the graphical user interface to present data indicative of the at least one of the thread level sentiment classification data or the case level sentiment classification data.

In an example 7, a method includes determining, in response to input of thread level classification data for a case and domain feature data into a machine-learned model, by the machine-learned model, case level sentiment classification data; the case comprising a sequence of text threads relating to a product and created during a time interval; the domain feature data relating to the product but not part of the case; the machine-learned model having been trained using at least two neural networks and neural networks; when the case level sentiment classification data satisfies a criterion, causing outputting of first data indicative of the issue with the product; when the case level classification data does not satisfy the criterion, causing outputting of second data indicative of the case level sentiment classification data. An example 8 includes the subject matter of example 7, and further includes a thread of the sequence of text threads including at least about 100 words. An example 9 includes the subject matter of example 7 or example 8, and further includes the sequence of text threads including at least one word that has a positive sentiment, at least one word that has a neutral sentiment and at least one word that has a negative sentiment, or the sequence of text threads including a majority of words that have a neutral sentiment. An example 10 includes the subject matter of any of examples 7-9, and further includes the sequence of text threads including at least about 1,000 words. An example 11 includes the subject matter of any of examples 7-10, and further includes the sequence of text threads comprising at least one text-based message sent from a sender user account to a recipient user account using message-based communication software. An example 12 includes the subject matter of any of examples 7-11, and further includes the domain feature data including at least one of a response time computed by comparing a timestamp of a first message in the sequence of text threads to a timestamp of a second message of the sequence of text threads, or a number of threads in the sequence of text threads, or a resolution time computed by comparing a timestamp of a first message in the sequence of text threads to a timestamp of a last message of the sequence of text threads. An example 13 includes the subject matter of any of examples 7-12, and further includes the at least two neural networks including a first neural network trained using as input thread level classification training data and a second neural network trained using as input training data that includes domain feature data. An example 14 includes the subject matter of any of examples 7-13, and further includes the machine-learned model including a max pooling layer that receives as input word embedding data and outputs thread level classification data. An example 15 includes the subject matter of any of examples 7-14, and further includes the machine-learned model including at least one residual layer that receives as input thread level sentiment classification data and the domain feature data and outputs the case level sentiment classification data. An example 16 includes the subject matter of any of examples 7-15, and further includes the criterion including at least one of a threshold sentiment score over all words in the sequence of text threads or a threshold sentiment score over all text threads in the sequence of text threads. An example 17 includes the subject matter of any of examples 7-16, and further includes rendering a graphical plot indicative of at least one of sentiment classification data by product or sentiment classification data by product feature or sentiment classification data over a time interval. An example 18 includes the subject matter of any of examples 7-17, and further includes the domain feature data collected by and obtained from case management software or customer support software. An example 19 includes the subject matter of any of examples 7-18, and further includes: determining thread level classification data, in response to input of semantic embedding data into a second machine-learned model, by the second machine-learned model; the semantic embedding data determined, in response to input of a text thread into a third machine-learned model, by the third machine-learned model; the text thread indicative of at least one communication that has occurred relating to the product. In an example 20, a system includes: first machine learning-based means for producing thread level classification data; and second machine learning-based means for producing case level classification data in response to input of the thread level classification data and domain feature data. In the foregoing specification, embodiments of the invention have been described with reference to numerous specific details that may vary from implementation to implementation.

The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method for detecting an issue relating to a service or software, the method comprising:
    determining, in response to input of a text thread into a first machine-learned model, by a layer t-1 of the first machine-learned model, semantic embedding data for the text thread;
    the text thread comprises at least one communication that has occurred relating to the service or software;
    determining, in response to input of the semantic embedding data determined by the layer t-1 of the first machine-learned model into a layer t of a second machine-learned model, by the second machine-learned model, thread level sentiment classification data;
    the thread level sentiment classification data comprises a first score of a set of ordered scores;
    determining, in response to input of at least thread level classification data for a case and domain feature data into a third machine-learned model, by the third machine-learned model, case level sentiment classification data;
    the case comprising a sequence of text threads;
    the domain feature data relating to the service or software but not part of the text thread;
    the case level sentiment classification data comprises a second score of the set of ordered scores.

2. The method of claim 1, further comprising the first machine-learned model having been trained by applying machine learning to a corpus of word level training data.

3. The method of claim 1, further comprising the second machine-learned model including a first neural network that has been trained by applying supervised machine learning to labeled embedding level training data.

4. The method of claim 3, further comprising the third machine-learned model having been trained using a second neural network.

5. The method of claim 1, further comprising, when at least one of the thread level sentiment classification data or the case level sentiment classification data satisfies a criterion, causing a graphical user interface to present data indicative of the issue with the service or software.

6. The method of claim 1, further comprising, when the at least one of the thread level classification data or the case level classification data does not satisfy the criterion, causing a graphical user interface to present data indicative of the at least one of the thread level sentiment classification data or the case level sentiment classification data.

7. A method comprising:
    determining, in response to input of thread level classification data for a case produced by a layer t-1 of a machine-learned model and domain feature data into a layer t of the machine-learned model, by the machine-learned model, case level sentiment classification data;
    the case comprising a sequence of text threads relating to a product and created during a time interval;
    the domain feature data relating to the product but not part of the case;
    the machine-learned model having been trained using at least two neural networks;
    when the case level sentiment classification data satisfies a criterion, causing outputting of first data indicative of the issue with the product;
    when the case level classification data does not satisfy the criterion, causing outputting of second data indicative of the case level sentiment classification data.

8. The method of claim 7, further comprising a thread of the sequence of text threads including at least about 100 words.

9. The method of claim 7, further comprising the sequence of text threads including at least one word that has a positive sentiment, at least one word that has a neutral sentiment and at least one word that has a negative sentiment, or the sequence of text threads including a majority of words that have a neutral sentiment.

10. The method of claim 7, further comprising the sequence of text threads including at least about 1,000 words.

11. The method of claim 7, further comprising the sequence of text threads comprising at least one text-based message sent from a sender user account to a recipient user account using message-based communication software.

12. The method of claim 7, further comprising the domain feature data including at least one of a response time computed by comparing a timestamp of a first message in the sequence of text threads to a timestamp of a second message of the sequence of text threads, or a number of threads in the sequence of text threads, or a resolution time computed by comparing a timestamp of a first message in the sequence of text threads to a timestamp of a last message of the sequence of text threads.

13. The method of claim 7, further comprising the at least two neural networks including a first neural network trained using as input thread level classification training data and a second neural network trained using as input training data that includes domain feature data.

14. The method of claim 7, further comprising the machine-learned model including a max pooling layer that receives as input word embedding data and outputs thread level classification data.

15. The method of claim 7, further comprising the machine-learned model including at least one residual layer that receives as input thread level sentiment classification data and the domain feature data and outputs the case level sentiment classification data.

16. The method of claim 7, further comprising the criterion including at least one of a threshold sentiment score over all words in the sequence of text threads or a threshold sentiment score over all text threads in the sequence of text threads.

17. The method of claim 7, further comprising rendering a graphical plot indicative of at least one of sentiment classification data by product or sentiment classification data by product feature or sentiment classification data over a time interval.

18. The method of claim 7, further comprising the domain feature data collected by and obtained from case management software or customer support software.

19. The method of claim 7, further comprising:
determining thread level classification data, in response to input of semantic embedding data into a second machine-learned model, by the second machine-learned model;
the semantic embedding data determined, in response to input of a text thread into a third machine-learned model, by the third machine-learned model;
the text thread indicative of at least one communication that has occurred relating to the product.

20. A system comprising:
at least one processor;
memory coupled to the at least one processor;
wherein the memory comprises instructions that when executed by the at least one processor cause the at least one processor to be capable of performing operations comprising:
producing, by a layer t-1 of a machine-learned model, thread level classification data in response to input of a text thread comprising at least one communication that has occurred relating to a service or software; and
producing case level classification data in response to input of the thread level classification data and domain feature data to a layer t of the machine-learned model;
wherein the thread level classification data comprises a first score of a set of ordered scores, the case level classification data comprises a second score of the set of ordered scores, and the domain feature data relates to a service or software but is not part of the text thread.

* * * * *